US006588709B1

(12) United States Patent
Dunne et al.

(10) Patent No.: US 6,588,709 B1
(45) Date of Patent: Jul. 8, 2003

(54) APPARATUS FOR VARIATION OF A WALL SKIN

(75) Inventors: James P. Dunne, Ballwin, MO (US); Dale M. Pitt, Afton, MO (US); Kevin J. Kilian, Kirkwood, MO (US); Edward V. White, Charles, MO (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/105,038

(22) Filed: Mar. 20, 2002

(51) Int. Cl.[7] .................................................. B64C 9/00
(52) U.S. Cl. ..................... 244/201; 244/200; 244/219; 244/123; 244/133; 160/236; 16/225
(58) Field of Search .............................. 244/123, 201, 244/133, 219, 200; 160/236; 16/225

(56) References Cited

U.S. PATENT DOCUMENTS

| 5,082,207 A | | 1/1992 | Tulinius ...................... 244/76 |
| 5,686,003 A | * | 11/1997 | Ingram et al. .............. 219/201 |
| 5,810,291 A | | 9/1998 | Geiger et al. ............... 244/133 |
| 5,845,530 A | | 12/1998 | Brockmeyer et al. ........ 74/97.1 |
| 5,913,494 A | | 6/1999 | Burbridge et al. .......... 244/213 |
| 5,918,834 A | | 7/1999 | Sommer et al. ............ 244/129 |
| 5,927,651 A | | 7/1999 | Geders et al. .............. 244/135 |
| 5,931,422 A | * | 8/1999 | Geiger et al. ............... 244/214 |
| 5,941,480 A | | 8/1999 | Wille ......................... 244/131 |
| 5,947,417 A | | 9/1999 | Cameron ................. 244/129.5 |
| 5,947,422 A | | 9/1999 | Wille ......................... 244/219 |
| 5,958,803 A | | 9/1999 | Geiger ........................ 442/71 |
| 5,975,463 A | | 11/1999 | Gruensfelder et al. ... 244/118.1 |
| 5,979,828 A | | 11/1999 | Gruensfelder et al. ... 244/129.1 |
| 6,027,074 A | * | 2/2000 | Cameron et al. ........... 244/133 |
| 6,048,581 A | | 4/2000 | Waldrop, III ............... 427/412 |
| 6,068,215 A | | 5/2000 | Gruensfelder et al. ... 244/129.5 |
| 6,076,766 A | | 6/2000 | Gruensfelder ............... 244/49 |
| 6,079,667 A | | 6/2000 | Gruensfelder ............... 244/53 |
| 6,089,505 A | * | 7/2000 | Gruensfelder et al. .... 244/53 B |
| 6,092,764 A | | 7/2000 | Geders et al. .............. 244/117 |
| 6,209,824 B1 | * | 4/2001 | Caton et al. ................ 244/213 |
| 6,213,433 B1 | | 4/2001 | Gruensfelder et al. ...... 244/219 |
| 6,231,006 B1 | * | 5/2001 | Gruensfelder et al. .... 244/53 B |
| 6,260,567 B1 | * | 7/2001 | Gruensfelder et al. ......... 137/1 |
| 6,276,026 B1 | | 8/2001 | Wille .......................... 16/250 |
| 6,337,294 B1 | | 1/2002 | Waldrop, III ................ 422/71 |
| 2002/0043590 A1 | * | 4/2002 | McCallum et al. ......... 244/219 |

OTHER PUBLICATIONS

Hopkins et al., *AIAA 99–1512 Adaptive Fighter Engine Inlet*, Apr. 12–15, 1999, pp. 1–12, The American Institute of Aeronautics and Astronautics.

Dunne et al., *Ground demonstration of the smart inlet*, Mar. 2000, 9 pages, SPIE.

Dunne et al., *AIAA 2000–1630 Ground Demonstration of The Smart Inlet*, Apr. 3–6, 2000, pp. 1–11, The American Institute of Aeronautics and Astronautics.

(List continued on next page.)

*Primary Examiner*—Michael J. Carone
*Assistant Examiner*—Gabriel S. Sukman
(74) *Attorney, Agent, or Firm*—The Boeing Company

(57) ABSTRACT

The present invention provides an apparatus and method for varying a wall skin to alter airflow over the skin. The apparatus has a first and second end-plates, a plurality of flexible rods are arranged substantially parallel to substantially define a plane, each flexible rod has a mid-point and first and second ends secured to the first and second end-plates respectively. Each mounting structure is slidingly attached to the flexible rods between the mid-point and each end-plate, proximate to the end. An elastomer envelops the rods to form a flexible skin. A plurality of shape memory alloy rods are arranged parallel to and define a plane and having each end secured to an end-plate, the plurality of shape memory alloy rods being contractible when heated such that upon contraction the plurality of shape memory allow rods will buckle the plurality of flexible rods and the flexible skin to alter airflow over the skin.

33 Claims, 5 Drawing Sheets

OTHER PUBLICATIONS

Pitt et al., *SPIE Paper No. 4332–43 Wind–Tunnel Demonstration Of The SAMPSON Smart Intel*, 2001, pp. 1–12, SPIE.

Pitt et al., *Sampson Smart Intlet SMA Powered Adaptive LIP Design and Static Test*, Apr. 2001, pp. 1–11, The American Institute of Aeronautics and Astronautics.

Pitt et al., *SAMPSON smart inlet design overview and wind tunnel test*, Mar., 2002, 24 pages, SPIE.

Pitt, et al., *Design and Test of a SMA Powered Adaptive Aircraft Inlet Internal Wall*, Apr. 2002, pp. 1–8, The American Institute of Aeronautics and Astronautics.

* cited by examiner

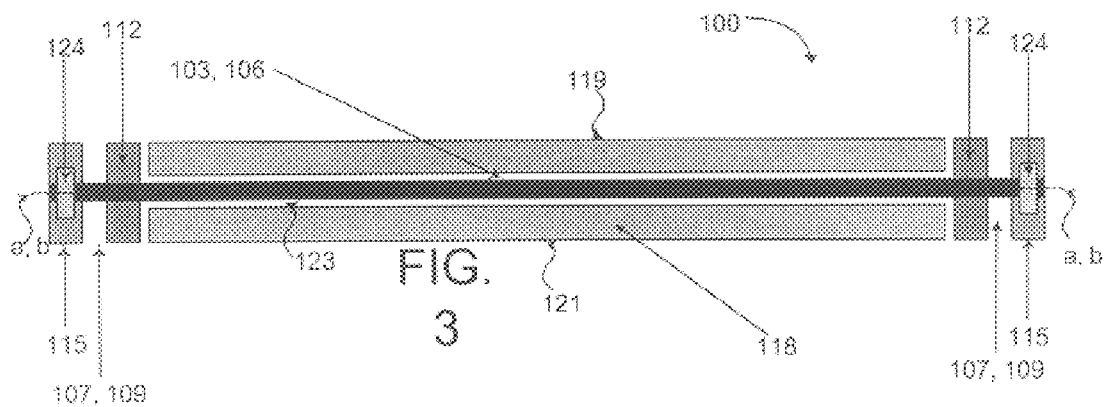
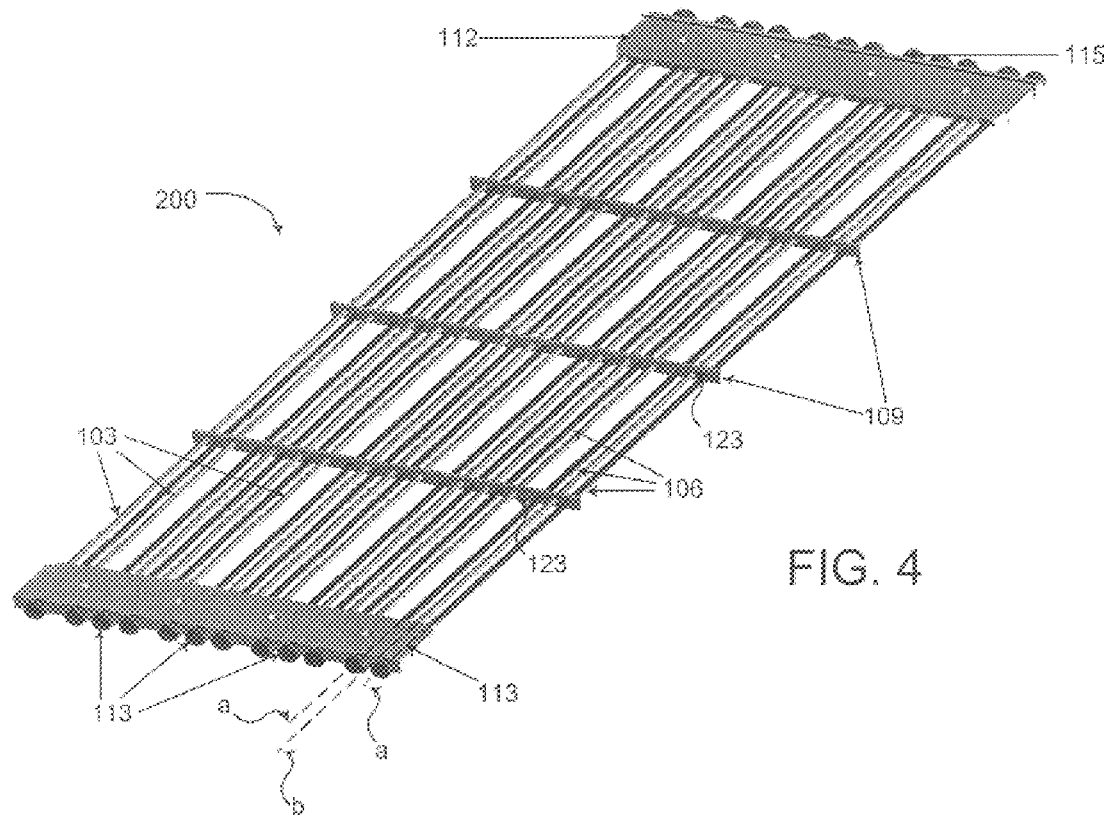

APPARATUS FOR VARIATION OF A WALL SKIN

GOVERNMENT LICENSE RIGHTS

This invention was made with government support under US Government contract MDA 972-97-3-0016 awarded by DARPA. The Government has certain rights in this invention.

FIELD OF THE INVENTION

This invention relates generally to aviation structures and, more specifically, to direction of airflow over airframe surfaces.

BACKGROUND OF THE INVENTION

The scientific principles of aviation are highly dependent upon the shapes of airfoils and attendant assemblies in an on-rushing stream of air. As the air flows past the outer skin of a given shape, deviations from planar surfaces might have profound effects, as in the application of the Bernoulli effect on the upper surface of a wing. As the rate of the airflow varies, the optimum shape to cause a given effect also varies.

As another example, optimum airflow for an engine varies with speed and altitude as well as a host of other variables. As a jet engine passes through air, the volume of air that passes through the jet engines varies with its speed. It is advantageous to control the volume of air with an iris at the intake duct. When too much air is allowed into the duct, excess air spills back causing drag. When too little air is allowed into the duct, the engine cannot run at its most efficient performance levels.

A general solution to this problem is a compromise such as selecting an average geometry of the intake duct. While not optimum, an average geometry most closely approximates an optimum geometry over the greatest portion of the operating spectrum. For some specialized applications, the cost of a variable intake duct is justified for achieving an optimum geometry. As an example, SR-71 Blackbird varies intake geometry to control air flow with an elaborate hydraulic system with an iris in the center of the intake duct.

Over time, the hydraulic system of the SR-71 has proven to be both costly and very heavy. Deployment of hydraulic actuators within the laminar airflow of a duct has proven as well to be inefficient. Additionally, previous designs have experienced problems with the support of seals and aerodynamic leaks.

Some experimental uses have shown that many of the same benefits of intake air flow control can be achieved with an iris that is actuated not from the center but from the sides by variation of the planar skin of the planar duct. By systematically bulging the inner sides of the intake duct, the diameter of the intake duct varies according to need. To date, however, the actuators necessary for such bulging have been heavy and difficult to place in the airframe due to the need for solid spots on the airframe to push against the wall of the intake duct. No such system has entered into production.

Thus, there is an unmet need in the art for effecting variations in a planar skin without aerodynamic leaks, weight, or complexity.

SUMMARY OF THE INVENTION

The present invention provides an apparatus and method for varying a wall skin to alter airflow over the skin. The apparatus has a first and second end-plates, a plurality of flexible rods are arranged substantially parallel to substantially define a plane, each flexible rod has a mid-point and first and second ends secured to the first and second end-plates respectively. Each mounting structure is slidingly attached to the flexible rods between the mid-point and each end-plate, proximate to the end. An elastomer envelops the rods to form a flexible skin. A plurality of shape memory alloy rods are arranged parallel to and define a plane and having each end secured to an end-plate, the plurality of shape memory alloy rods being contractible when heated such that upon contraction the plurality of shape memory alloy rods will buckle the plurality of flexible rods and the flexible skin to alter the airflow.

When arranged around the inside walls of a inlet duct to a jet engine, the flexible skin forms an effective iris for controlling airflow into the intake of the jet engine. By controlling the signal applied to the Shape Memory Alloy (SMA) rods, a sensor system can optimize the airflow to the jet assuring most efficient propulsion. The elastomer used in conjunction with the flexible rods provides compliance the metallic structures lack while providing good load carrying capability. The shape memory alloy rods present an uncomplicated lightweight and easily controllable actuator system when compared to the hydraulic equipment.

BRIEF DESCRIPTION OF THE DRAWINGS

The preferred and alternative embodiments of the present invention are described in detail below with reference to the following drawings.

FIG. 3 is a detailed cross section of a flexible panel with controlled buckling device;

FIG. 4 is an oblique view of an alternate embodiment of the flexible panel with a controlled buckling device;

DETAILED DESCRIPTION OF THE PREFERRED EMBODIMENT

Figure 1:
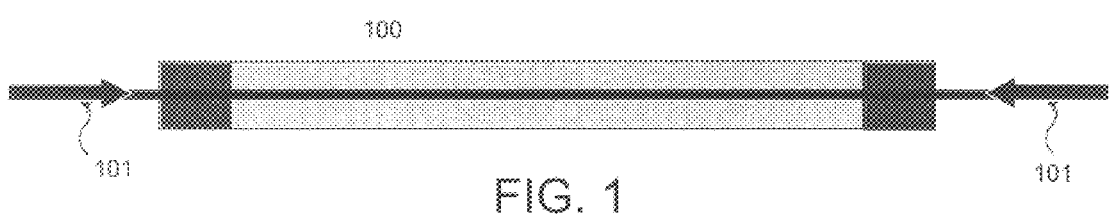
FIG. 1 is a cross section of a flexible skin panel.
Figure 2:
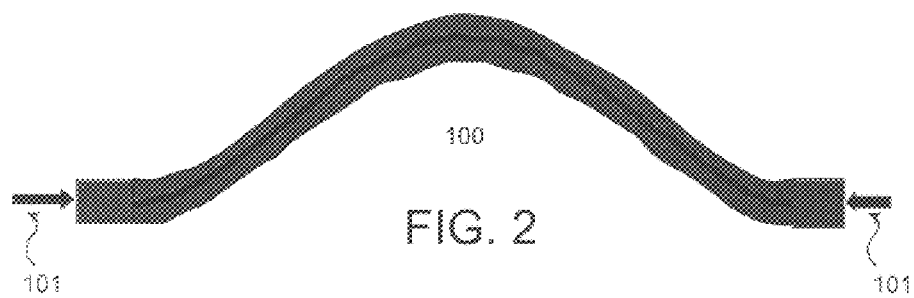
FIG. 2 is the cross section of a controlled buckling of a flexible panel as a result of inward radial forces applied.

FIG. 1 shows a generalized cross sectional diagram of a flexible panel 100 according to the invention. The application of forces 101 axially and inwardly along a cross-section of this system 100 results in a controlled buckling of the panel 100 as shown in FIG. 2. This buckling is exploited by the invention in order to modify airflow over the skin.

Given by way of non-limiting example, the panel 100 is suitably a flexible skin panel of an intake duct of a jet engine. However it will be appreciated that the panel 100 is also suitably a top skin panel of an aircraft wing, such that the top skin panel of the wing can be altered for optimizing lift characteristics at a given speed. It will be appreciated that the invention is readily applicable to other applications as well.

FIG. 3 shows a more detailed cross section of the panel 100. The panel 100 includes an elastomer panel or skin 118 with an upper surface 119 and a lower surface 121 and a plurality of channels 123 defined therebetween. A preferred elastomer is suitably any one of a variety of rubber compounds that may be selected according to the application in mind. Other acceptable elastomers are suitably selected according to other applications. Because rubber has a low durometer rating, it tends not to hold a given shape. In order to stiffen the elastomer panel 118, a plurality of rods 106 are interposed in passages through the cross section of the elastomer panel 118. The plurality of rods 106 lends stiffness to the elastomer panel 118. Any flexible material with suitable stiffness and durability can be used for the rods 106. Suitable material for the rods 106 includes a composite material such as fiberglass, carbon-graphite rods, quartz composite, or suitable metal alloys. Each of the rods 106 has an axis a and ends 107.

The ends 107 extend beyond edges of the elastomer panel 118 through sliding mounting plates 112 to an end-plate 115. The ends 107 are fixedly attached to the end-plate 115 by a clamp 124. The mounting plates 112 allow the rods 106 one degree of freedom of movement that is along the axis a. The end-plates 115 are fixedly attached to surrounding structure (not shown). In that manner, the whole of the panel 100 may be mounted by the mounting plates 112 while still allowing the rods 106 to move slidingly along their axes a.

Shape Metal Alloy (SMA) rods 103 having ends 107 and an axis b are interposed in a manner similar to the flexible rods 106. As is known, SMA is a Nickel-Titanium based alloy that exhibits unique characteristics as it goes through a phase change from a Martensite state to an Austenite state. The phase transformation can either be temperature induced or stress induced. The SMA material can be subjected to high strains (up to 8%) in the low temperature Martensite state, and will recover that strain and the SMA will return to "trained" shape, contracting as it changes when heated to the Austenite phase. SMA also exhibits super-elastic capabilities while in the Austenite state. Where the "trained" shape is a rod, the change of phase is demonstrated by the contraction of that rod. This contraction allows the SMA rod 103 to be used as an actuator.

The SMA rods 103 are affixed under strain at their ends by clamps 124 to the end-plate 115. Like the rods 106, the SMA rods 103 pass slidingly through the mounting plate 112. However, the SMA rods 103 pass outside of the elastomer in order to promote the buckling displayed in FIG. 2. In one preferred embodiment, the SMA rods 103 pass through the channels 123. However, channels 123 for the SMA rods 103 are open at the bottom, that is the lower surface 121 is absent, to promote predictable buckling of the elastomer panel 118.

The invention operates as follows. To actuate the invention, the SMA rods 103 are suitably heated. In a preferred embodiment a suitable electrical current is passed through the SMA rods 103. However, it will be appreciated that any suitable source of heat will actuate the SMA rods 103. The SMA rods 103 will change phase from its Martensite state, and will contract to recover the strain and return to its original shape when heated to the Austenite phase. In terms of stress recovery, which is the mechanism that produces force, the SMA rods 103 also change modulus when going through the phase change. Advantageously, the change in modulus may be significant.

In the course of the recovery of strain, the SMA rods 103 pull the end-plates 115 toward each other. The flexible rods 106 will not compress axially. Instead, the rods 106 buckle, taking with them the elastomer panel 118. The channels 123 preferably allow the SMA rods 103 to contract in a manner to bow the flexible rods 106 curving toward the lower surface 121. Because the mounting plates 112 fix the ends 107 of the flexible rods 103, the contraction of the SMA forces the upper surface 119 to protrude upward. This protrusion alters the airflow over the elastomer panel 118.

FIG. 4 shows another embodiment of the invention. A panel 200 includes a sliding mounting plate 112 at one end of the panel 200. Another end of the panel 200 includes a combination mounting end-plate 113. The ends 107 and 109 are fixedly attached to the combination mounting end-plate 113. Additionally, keepers 109 suitably maintain spacing between adjacent flexible rods 106 and SMA rods 103. The keepers 109 define the channels 123 for the rods 103 and 106. The channels 123 for the flexible rods 106 are closed and match the cross-section of the rod 106. The channels 123 for the SMA rods 103 are open at the lower surface (not shown) of the elastomer panel 118 and the keepers 109, as discussed above, to allow the controlled and predictable buckling of the elastomer panel 118. The keepers 109 allow the rods 106 to slide along the axis a.

The operation of the remaining end of the panel 200 is the same as the panel 100 (FIG. 1). The rods 106 and the SMA rods 103 pass slidingly through the mounting plate 112. The end-plate 115 securely holds the ends 107 and 109. Contraction of the SMA rods 103 upon actuation by heating buckles the panel 200 by moving the end-plate 115 toward the combination mounting end-plate 113.

In the preceding discussion, the rods 106 and the SMA rods 103 are arranged as coplanar. The defined channels 123 in the lower surface 119 control buckling. Where an application indicates the desirability of doing so, the channels 123 containing the SMA rods 103 can be eliminated in favor of offsetting the SMA rods 103 to a position adjacent to and parallel to the lower surface 119. In either preferred embodiment, the SMA rods 103 are effective to buckle the rods 106 upon phase change.

Figure 5:
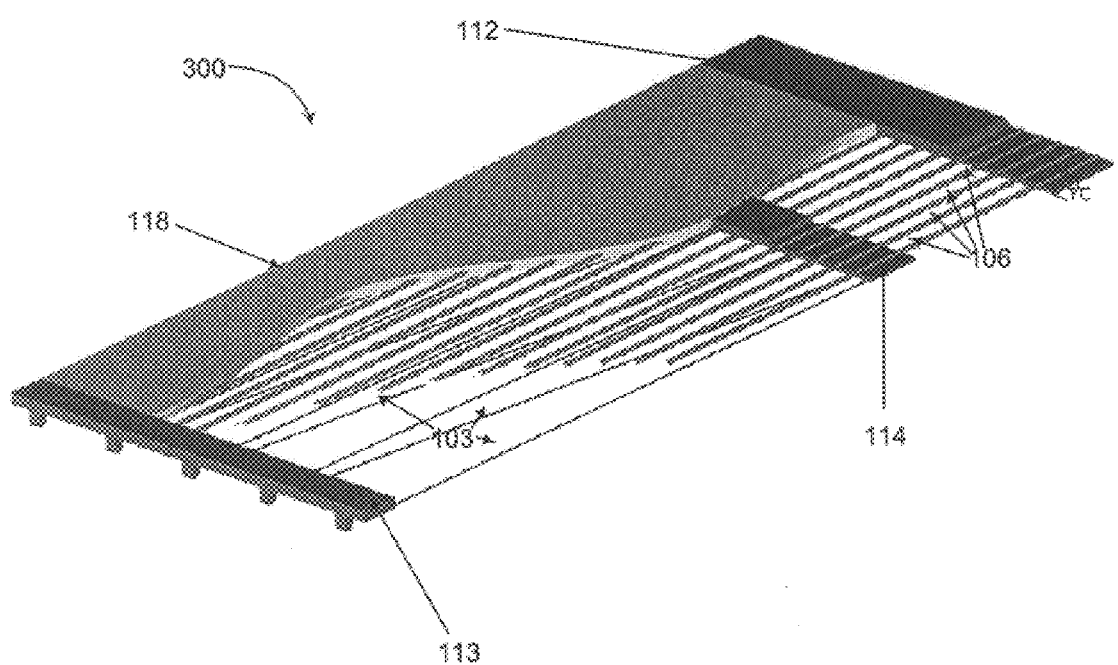
FIG. 5 is another alternate embodiment of a flexible panel with a controlled buckling device.

FIG. 5 shows a perspective view of another embodiment of the invention. A panel 300 shares many common elements with the earlier discussed embodiments. The mounting plate 112 moves outboard of a securing point of the SMA rods 103 and the rods 106. Rather than including an end-plate 115, the panel 300 includes a bridge 114 for securing the rods 106 and the SMA rods 103 at a point inboard of the mounting plate 112.

Figure 6:
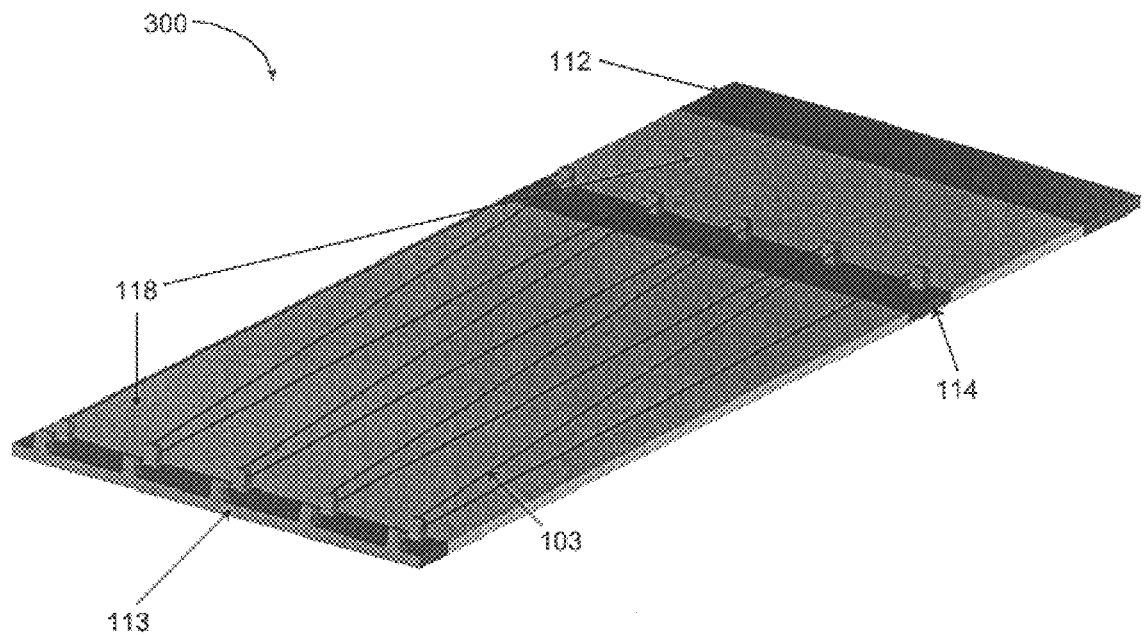
FIG. 6 is a reverse oblique view of another alternate embodiment of the flexible panel with a controlled buckling device.

FIG. 6 shows a reverse perspective view of the panel 300. Unlike the panels 100 (FIG. 3) and 200 (FIG. 4), in the panel 300, the SMA rods 103 are not in channels in the elastomer 118 but are offset slightly to enhance the buckling effect locally between the combination mounting end-plate 113 and the bridge 114. The offsetting is not necessary, however, to practice this embodiment. Panel 300 provides an aerodynamic seal between the buckling and the mounting plate 112.

Figure 7:
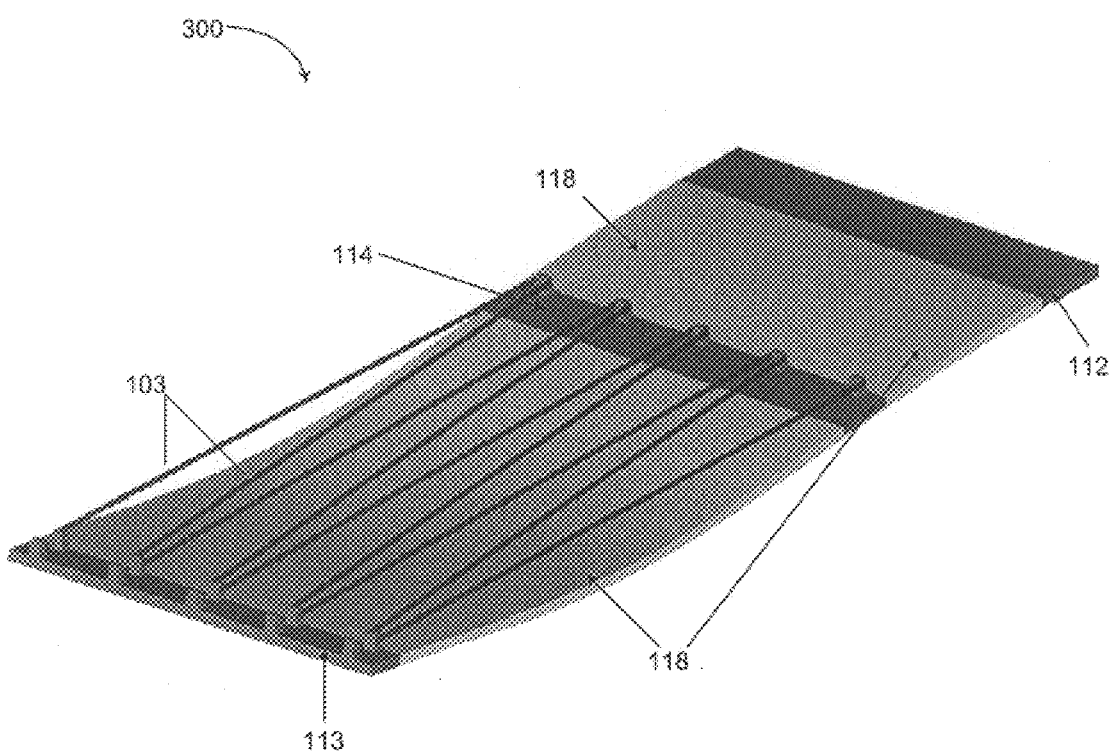
FIG. 7 is a reverse view of the flexible panel of another alternate embodiment of the flexible panel with a controlled buckling device demonstrating controlled buckling.

FIG. 7 shows the same reverse perspective view of the panel 300 displayed in FIG. 6 with the SMA rods 103 actuated. As the SMA rods 103 contract upon being heated, the bridge places a compressing force on the flexible rods 106 between the combination mounting end-plate 113 and the bridge 114. Simultaneously, the SMA rods pull the bridge 114 away from the mounting plate 112. Pulling the bridge 114 away stretches the elastomer 118 between the bridge 114 and the mounting plate 112 and pulls the rods 106 through the mounting plate 112.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An apparatus for varying a wall skin to alter airflow over the skin, the apparatus comprising:

first and second end-plates;

a plurality of flexible rods arranged substantially parallel to substantially define a plane, each flexible rod having a mid-point and first and second ends, the first end being secured to the first end-plate and the second end being secured to the second end-plate;

a first mounting structure slidingly attached to the plurality of flexible rods between the mid-point and the first end, proximate to the first end-plate;

a second mounting structure slidingly attached to the plurality of flexible rods between the mid-point and the first outer end, proximate to the second end-plate;

an elastomer enveloping the plurality of flexible rods between the first mounting structure and the second mounting structure and bonded to the first mounting structure and to the second mounting structure to form a flexible skin that has a first side and a second side; and a plurality of shape memory alloy rods, each of the shape memory alloy rods having an austenite and a martensite phase, the plurality of shape memory alloy rods being arranged substantially parallel to substantially define a plane, the shape memory alloy rods having a midpoint and a first end secured to the first end-plate and a second end secured to the second end-plate, the plurality of shape memory alloy rods being contractible when heated such that upon contraction the plurality of shape memory alloy rods will buckle the plurality of flexible rods and the flexible skin to alter airflow over the skin.

2. The apparatus of claim 1, wherein the shape memory alloy rods when in the austenite phase are parallel to the flexible rods and within the plane defined by the plurality of flexible rods.

3. The apparatus of claim 2, wherein the second side of the flexible skin defines a plurality of channels that are parallel to each of the plurality of flexible rods, and wherein each of the plurality of the shape memory alloy rods are interposed in the plurality of channels when the shape memory alloy rods are in the austenite phase.

4. The apparatus of claim 1, wherein the plane of the shape memory alloy rods is offset from the plane of the flexible rods.

5. The apparatus of claim 1, wherein plane of the shape memory alloy rods is substantially coplanar with the plane of the flexible rods.

6. The apparatus of claim 1, wherein the shape memory alloy is Nickel-Titanium based.

7. An apparatus for varying a wall skin to alter airflow over the skin, the apparatus comprising:

an end-plate;

a combination mounting end-plate;

a plurality of flexible rods arranged substantially parallel to substantially define a plane, each flexible rod having a mid-point and first and second ends, the first end being secured to the end-plate and the second end being secured to the combination mounting end-plate;

a mounting structure slidingly attached to the plurality of flexible rods between the mid-point and the first end, proximate to the end-plate structure;

an elastomer enveloping the plurality of rods between the mounting structure and the combination mounting end-plate and bonded to the mounting structure and to the combination mounting end-plate to form a flexible skin that has a first and a second side; and a plurality of shape memory alloy rods, each of the shape memory alloy rods having an austenite and a martensite phase, the plurality of shape memory alloy rods being arranged substantially parallel to substantially define a plane, the shape memory alloy rods having a midpoint and a first end secured to the end-plate and a second end secured to the combination mounting end-plate, the plurality of shape memory alloy rods being contractible when heated to buckle the plurality of flexible rods and the flexible skin to alter airflow over the skin.

8. The apparatus of claim 7, wherein the shape memory alloy rods when in the austenite phase are parallel to the flexible rods and within the plane defined by the plurality of flexible rods.

9. The apparatus of claim 8, wherein the second side of the flexible skin defines a plurality of channels that are parallel to each of the plurality of flexible rods, and wherein each of the plurality of the shape memory alloy rods are interposed in the plurality of channels when the shape memory alloy rods are in the austenite phase.

10. The apparatus of claim 7, wherein the plane of the shape memory alloy rods is offset from the plane of the flexible rods.

11. The apparatus of claim 7, wherein plane of the shape memory alloy rods is substantially coplanar with the plane of the flexible rods.

12. The apparatus of claim 7, wherein the shape memory alloy is Nickel-Titanium based.

13. An apparatus for varying a wall skin to alter airflow over the skin, the apparatus comprising:

a bridge;

a combination mounting end-plate;

a plurality of flexible rods arranged substantially parallel to substantially define a plane, each flexible rod having a mid-point and first and second ends and having a bridge-point between the mid-point and the second end, the first end being secured to the combination end-plate and the bridge-point being secured to the bridge structure;

a mounting structure slidingly attached to the plurality of flexible rods at the second outer end;

an elastomer enveloping the plurality of flexible rods between the mounting structure and the combination mounting end-plate and bonded to the mounting structure, to the bridge, and to the combination mounting end-plate to form a flexible skin that has a first side and a second side; and a plurality of shape memory alloy rods, each of the shape memory alloy rods having an austenite and a martensite phase, the plurality of shape memory alloy rods being arranged substantially parallel to substantially define a plane, the shape memory alloy rods having a mid-point and first and second ends and having a bridge-point between the mid-point and the second end, the first end being secured to the combination end-plate and the bridge-point being secured to the bridge structure, the plurality of shape memory alloy rods being contractible when heated to buckle the plurality of flexible rods and the flexible skin to alter airflow over the skin.

14. The apparatus of claim 13, wherein the shape memory alloy rods when in the austenite phase are parallel to the flexible rods and within the plane defined by the plurality of flexible rods.

15. The apparatus of claim 14, wherein the second side of the flexible skin defines a plurality of channels that are parallel to each of the plurality of flexible rods, and wherein each of the plurality of the shape memory alloy rods are interposed in the plurality of channels when the shape memory alloy rods are in the austenite phase.

16. The apparatus of claim 13, wherein the plane of the shape memory alloy rods is offset from the plane of the flexible rods.

17. The apparatus of claim 13, wherein plane of the shape memory alloy rods is substantially coplanar with the plane of the flexible rods.

18. The apparatus of claim 13, wherein the shape memory alloy is Nickel-Titanium based.

19. A method for varying a wall skin to alter airflow over the skin, the method comprising:

providing first and second end-plates;

arranging a plurality of flexible rods substantially parallel to substantially define a plane, each flexible rod having a mid-point and first and second ends, the first end being secured to the first end-plate and the second end being secured to the second end-plate;

providing a first mounting structure slidingly attached to the plurality of flexible rods between the mid-point and the first end, proximate to the first end-plate;

providing a second mounting structure slidingly attached to the plurality of flexible rods between the mid-point and the first outer end, proximate to the second end-plate;

enveloping the plurality of flexible rods with an elastomer between the first mounting structure and the second mounting structure and bonded to the first mounting structure and to the second mounting structure to form a flexible skin that has a first side and a second side;

arranging a plurality of shape memory alloy rods substantially parallel to substantially define a plane, each of the shape memory alloy rods having an austenite and a martensite phase, the plurality of shape memory alloy rods being arranged substantially parallel to substantially define a plane, the shape memory rod having a midpoint and a first end secured to the first end-plate and a second end secured to the second end-plate; and heating the plurality of shape memory alloy rods to change the plurality of shape memory alloy rods from the austenite phase to the martensite phase, causing the shape memory alloy rods to contract such that upon contraction the plurality of shape memory alloy rods will buckle the plurality of flexible rods and the flexible skin to alter airflow over the skin.

20. The method of claim 19, wherein arranging the shape memory alloy rods includes arranging the shape memory alloy rods while in the austenite phase to be coplanar with the plurality of flexible rods.

21. The method of claim 19, wherein arranging the shape memory alloy rods includes interposing the shape memory alloy rods in a plurality of channels defined in the second side of the flexible skin parallel the plurality of flexible rods.

22. The method of claim 19, wherein arranging the shape memory alloy rods includes offsetting the plane of the shape memory alloy rods from the plane of the flexible rods.

23. The method of claim 19, wherein the shape memory alloy is Nickel-Titanium based alloy.

24. A method for varying a wall skin to alter airflow over the skin, the method comprising:

providing an end-plate;

providing a combination mounting end-plate;

arranging a plurality of flexible rods substantially parallel to substantially define a plane, each flexible rod having a mid-point and first and second ends, the first end being secured to the end-plate and the second end being secured to the combination mounting end-plate;

providing a mounting structure slidingly attached to the plurality of flexible rods between the mid-point and the first end, proximate to the end-plate;

enveloping the plurality of rods with an elastomer between the mounting structure and the combination mounting end-plate and bonded to the mounting structure and to the combination mounting end-plate to form a flexible skin that has a first and a second side;

arranging a plurality of shape memory alloy rods substantially parallel to substantially define a plane, each of the shape memory alloy rods having an austenite and a martensite phase, the plurality of shape memory alloy rods being arranged substantially parallel to substantially define a plane, the shape memory rod having a midpoint and a first end secured to the first end-plate and a second end secured to the second end-plate; and heating the plurality of shape memory alloy rods to change the plurality of shape memory alloy rods from the austenite phase to the martensite phase, causing the shape memory alloy rods to contract such that upon contraction the plurality of shape memory alloy rods will buckle the plurality of flexible rods and the flexible skin to alter airflow over the skin.

25. The method of claim 24, wherein arranging the shape memory alloy rods includes arranging the shape memory alloy rods while in the austenite phase to be coplanar with the plurality of flexible rods.

26. The method of claim 24, wherein arranging the shape memory alloy rods includes interposing the shape memory alloy rods in a plurality of channels defined in the second side of the flexible skin parallel the plurality of flexible rods.

27. The method of claim 24, wherein arranging the shape memory alloy rods includes offsetting the plane of the shape memory alloy rods from the plane of the flexible rods.

28. The apparatus of claim 24, wherein the shape memory alloy is Nickel-Titanium based alloy.

29. A method for varying a wall skin to alter airflow over the skin, the method comprising:

providing a bridge;

providing a combination mounting end-plate;

arranging a plurality of flexible rods substantially parallel to substantially define a plane, each flexible rod having a mid-point and first and second ends and having a bridge-point between the mid-point and the second end, the first end being secured to the combination end-plate and the bridge-point being secured to the bridge structure;

providing a mounting structure slidingly attached to the plurality of flexible rods at the second outer end;

enveloping the plurality of flexible rods with an elastomer between the mounting structure and the combination mounting end-plate and bonded to the mounting structure, to the bridge, and to the combination mounting end-plate to form a flexible skin that has a first side and a second side;

arranging a plurality of shape memory alloy rods substantially parallel to substantially define a plane, each of the shape memory alloy rods having an austenite and a martensite phase, the plurality of shape memory alloy rods being arranged substantially parallel to substantially define a plane, the shape memory rod having a midpoint and a first end secured to the combination end-plate and a second end secured to the bridge structure; and heating the plurality of shape memory alloy rods to change the plurality of shape memory alloy rods from the austenite phase to the martensite phase, causing the shape memory alloy rods to contract such that upon contraction the plurality of shape memory alloy rods will buckle the plurality of flexible rods and the flexible skin to alter airflow over the skin.

30. The apparatus of claim 29, wherein arranging the shape memory alloy rods includes arranging the shape memory alloy rods while in the austenite phase to be coplanar with the plurality of flexible rods.

31. The apparatus of claim 30, wherein arranging the shape memory alloy rods includes interposing the shape memory alloy rods in a plurality of channels defined in the second side of the flexible skin parallel the plurality of flexible rods.

32. The apparatus of claim 29, wherein arranging the shape memory alloy rods includes offsetting the plane of the shape memory alloy rods from the plane of the flexible rods.

33. The apparatus of claim 29, wherein the shape memory alloy is Nickel-Titanium based alloy.

* * * * *